(12) United States Patent
Gal et al.

(10) Patent No.: US 6,341,563 B1
(45) Date of Patent: Jan. 29, 2002

(54) DOOR OPENING CONTROL APPARATUS

(75) Inventors: Eli Gal, Ramat Gan; Uri Agam, Petach Tikva; Eli Ben-Bassat, Holon; Ronen Jashek, Yashresh, all of (IL)

(73) Assignee: Sensotech Ltd., Petach Tikva (IL)

( * ) Notice: Subject to any disclaimer, the term of this patent is extended or adjusted under 35 U.S.C. 154(b) by 0 days.

(21) Appl. No.: 09/445,943

(22) PCT Filed: Jun. 11, 1998

(86) PCT No.: PCT/IL98/00268

§ 371 Date: Mar. 13, 2000

§ 102(e) Date: Mar. 13, 2000

(87) PCT Pub. No.: WO98/00268

PCT Pub. Date: Dec. 23, 1998

(30) Foreign Application Priority Data

Jun. 19, 1997 (IL) ................................................ 121120

(51) Int. Cl.⁷ ........................ B60N 5/00; B61D 23/02; B61D 47/00; E05F 15/20
(52) U.S. Cl. ...................... 104/28; 105/341; 105/427; 105/430; 105/433; 105/444; 105/449; 49/25; 49/31
(58) Field of Search ................................. 105/425, 427, 105/430, 432, 433, 444, 449, 341; 104/28; 49/25, 31

(56) References Cited

U.S. PATENT DOCUMENTS

| 1,527,411 A | | 2/1925 | Hedley et al. |
| 3,561,160 A | | 2/1971 | Chan |
| 3,575,604 A | * | 4/1971 | Smith ........................ 105/341 |
| 3,782,034 A | | 1/1974 | Lynn et al. |
| 4,290,368 A | | 9/1981 | Mazzini |
| 4,503,778 A | * | 3/1985 | Wilson ........................ 104/28 |
| 4,604,826 A | | 8/1986 | Sorber |
| 4,656,950 A | | 4/1987 | Rhoton |
| 4,665,378 A | | 5/1987 | Heckethorn |
| 4,766,696 A | | 8/1988 | Huon de Kermadec |
| 4,967,083 A | | 10/1990 | Kornbrekke et al. |
| 4,976,337 A | | 12/1990 | Trett |
| 4,981,084 A | | 1/1991 | Templeton et al. |
| 5,119,739 A | * | 6/1992 | Templeton et al. ......... 105/341 |
| 5,134,350 A | * | 7/1992 | Mahoney ..................... 105/341 |
| 5,142,152 A | | 8/1992 | Boiucaner |
| 5,176,082 A | | 1/1993 | Chun et al. |
| 5,226,370 A | | 7/1993 | Templeton et al. |
| 5,347,755 A | | 9/1994 | Jaster et al. |
| 5,422,552 A | | 6/1995 | Parisi |
| 5,541,585 A | | 7/1996 | Duhame et al. |
| 5,936,232 A | * | 8/1999 | Saretzky ..................... 105/341 |

FOREIGN PATENT DOCUMENTS

| DE | 2221575 | 11/1973 |
| DE | 2423467 | 12/1974 |
| DE | 2910260 | 9/1980 |
| GB | 1446819 | 8/1976 |
| JP | 53-582 | 1/1978 |
| JP | 53-127096 | 11/1978 |

* cited by examiner

Primary Examiner—Joseph D. Pape
Assistant Examiner—G Blankenship
(74) Attorney, Agent, or Firm—Darby & Darby (57) ABSTRACT

A platform sensing and control system including a wireless sensor (10, 12) for sensing at least the presence of a platform (26) opposite a door (32) of a railcar and providing an output indication of at least a platform presence in response thereto, and a door control controller (14) operative in response to the output indication of at least platform (26) presence for enduring that normally a door (32) is not opened other than when a platform (26) is located opposite such door (32).

44 Claims, 6 Drawing Sheets

DOOR OPENING CONTROL APPARATUS

FIELD OF THE INVENTION

The present invention relates to railways generally and more particularly to door opening control apparatus.

BACKGROUND OF THE INVENTION

Various types of door opening control apparatus are known for railway cars. The following U.S. Patent are believed to be representative of the state of the art: U.S. Pat. Nos. 4,656,950; 4,766,696 and 1,527,411. These patents show the use of mechanical sensors for sensing the relative location of a platform to a railcar.

SUMMARY OF THE INVENTION

The present invention seeks to provide an improved platform sensing and control system for use with railcars.

There is thus provided in accordance with a preferred embodiment of the present invention a platform sensing and control system including a wireless sensor for sensing at least the presence of a platform opposite a door of a railcar and providing an output indication of at least platform presence in response thereto, and a door control controller operative in response to the output indication of at least platform presence for ensuring that normally a door is not opened other than when a platform is located opposite such door.

Preferably, the wireless sensor is operative to provide an output indication of at least platform height and transverse distance from a railcar door to the platform.

In accordance with a preferred embodiment of the present invention the system also includes a selectably positionable step or platform assembly associated with the railcar door.

Additionally in accordance with a preferred embodiment of the present invention, the system additionally includes an audio annunciator to provide information to travelers regarding at least one of the following: which doors are being opened, transverse distance between the railcar and the platform, and relative height between the railcar and the platform.

Further in accordance with a preferred embodiment of the present invention, the system additionally includes a visual indicator to provide information to travelers regarding at least one of the following: which doors are being opened, transverse distance between the railcar and the platform, and relative height between the railcar and the platform.

It is appreciated that a single sensor or pair of sensors may be provided on each side of a railcar or each side of a train. Alternatively sensors may be provided in association with each of the doors.

The present invention applies to all suitable types of rolling stock, including both conventional intercity railroads and subway trains.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENT

Reference is now made to FIGS. 1A, 1B, 1C and 2 which illustrate a platform sensing and control system constructed and operative in accordance with a preferred embodiment of the present invention. The platform sensing and control system is preferably characterized in that it is wireless and that it does not require physical contact between a railcar and a platform.

In accordance with a preferred embodiment of the invention, there are provided a pair of acoustic sensors 10 and 12 on each side of a railcar. Acoustic sensor 10 is preferably positioned at or near platform level and is operative to sense both the presence of and the transverse distance to the platform. Acoustic sensor 12 is preferably located above door level, at or adjacent each door, for sensing the vertical distance to the platform surface.

Acoustic sensors 10 and 12 are preferably acoustic sensors commercially available from Airmar Co., USA, under catalog number AT120. Alternatively any other suitable acoustic or other wireless sensors may be employed. As a further alternative, shown in FIG. 1A only, the platform may have mounted thereon a passive 11 or active 13 device for communicating with one or both of sensors 10 and 12 and providing information thereto.

As will be described hereinbelow with reference to FIG. 3, sensors 10 and 12 preferably provide information as to the presence of, transverse distance to and relative height of the platform with respect to the rail car to a microcontroller 14 (FIG. 3), such as an Intel 80C196 microcontroller, which processes this information and provides control outputs to various devices in the railcar.

The microcontroller 14 may perform pattern recognition of acoustic or other images of the platform received by sensors 10 and 12, so as to derive information as to the presence of, transverse distance to and relative height of the platform with respect to the rail car.

In accordance with a preferred embodiment of the present invention, the microcontroller 14 provides a door opening or opening enabling output to an electrically or pneumatically operated door 16, when the presence of the platform at a desired location is sensed. Preferably the microcontroller 14 also provides a platform transverse distance output indication to a selectably positionable step or platform assembly 18 associated with the railcar.

Additionally in accordance with a preferred embodiment of the present invention, the microcontroller 14 also provides a platform height output indication to selectably positionable step or platform assembly 18 or to apparatus 20 (FIG. 2) for raising or lowering the height of the entire railcar.

Additionally an output from microcontroller 14 may also be provided to an audio annunciator 22 and/or a visual display 23 to provide pre-recorded or computer generated messages or other indications to travelers as to which doors are being opened and whether special care needs to be taken because of the transverse distance between the railcar and the platform or the relative height between the railcar and the platform.

Figure 1A:
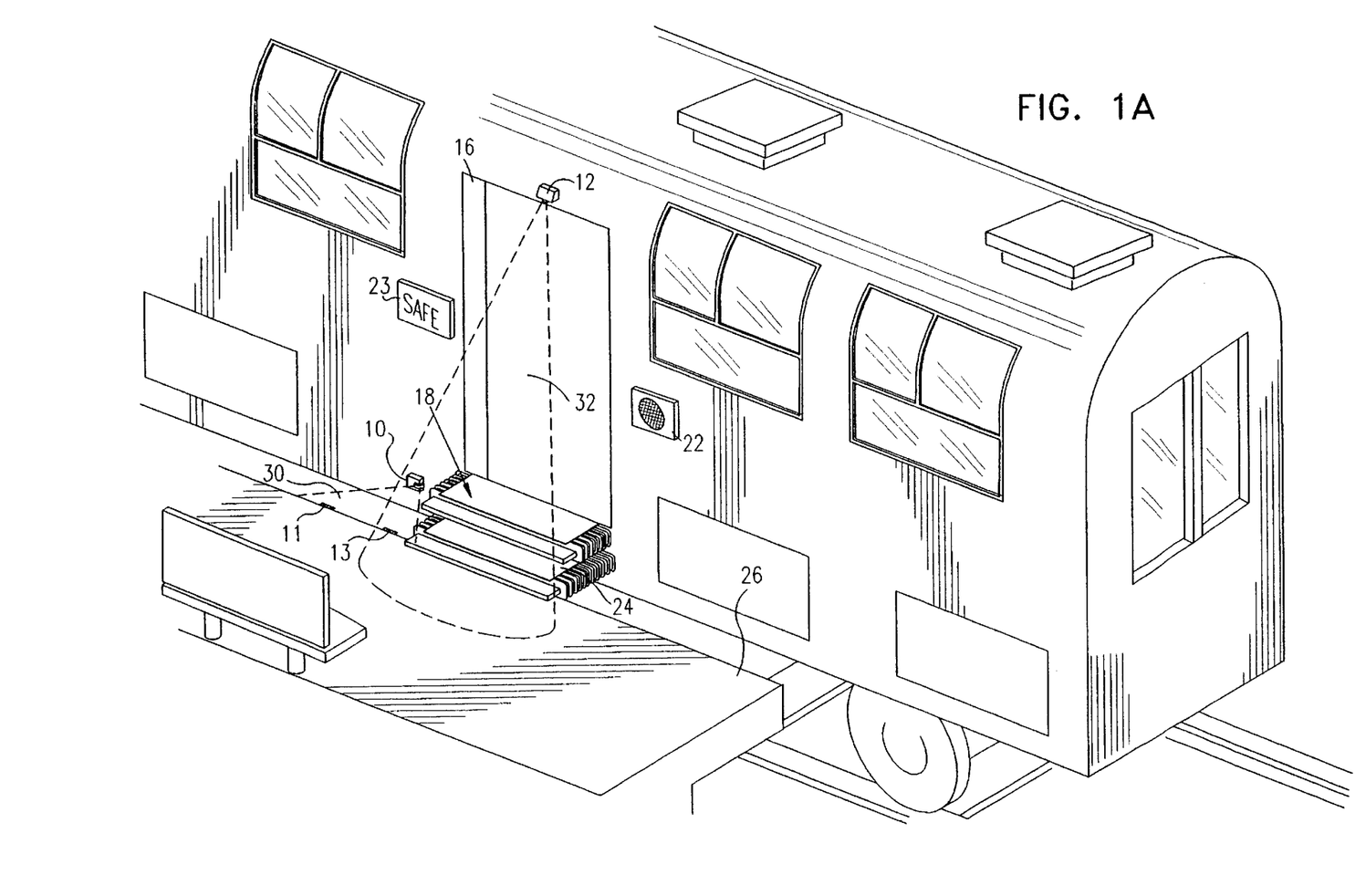
FIGS. 1A, 1B and 1C are pictorial illustrations of a railway car equipped with a platform sensing and control system constructed and operative in accordance with a preferred embodiment of the present invention, wherein in FIG. 1A a plurality of steps are positioned above a platform, in FIG. 1B the steps are positioned below the platform, and in FIG. 1C the steps are flush with the platform.
Figure 1B:
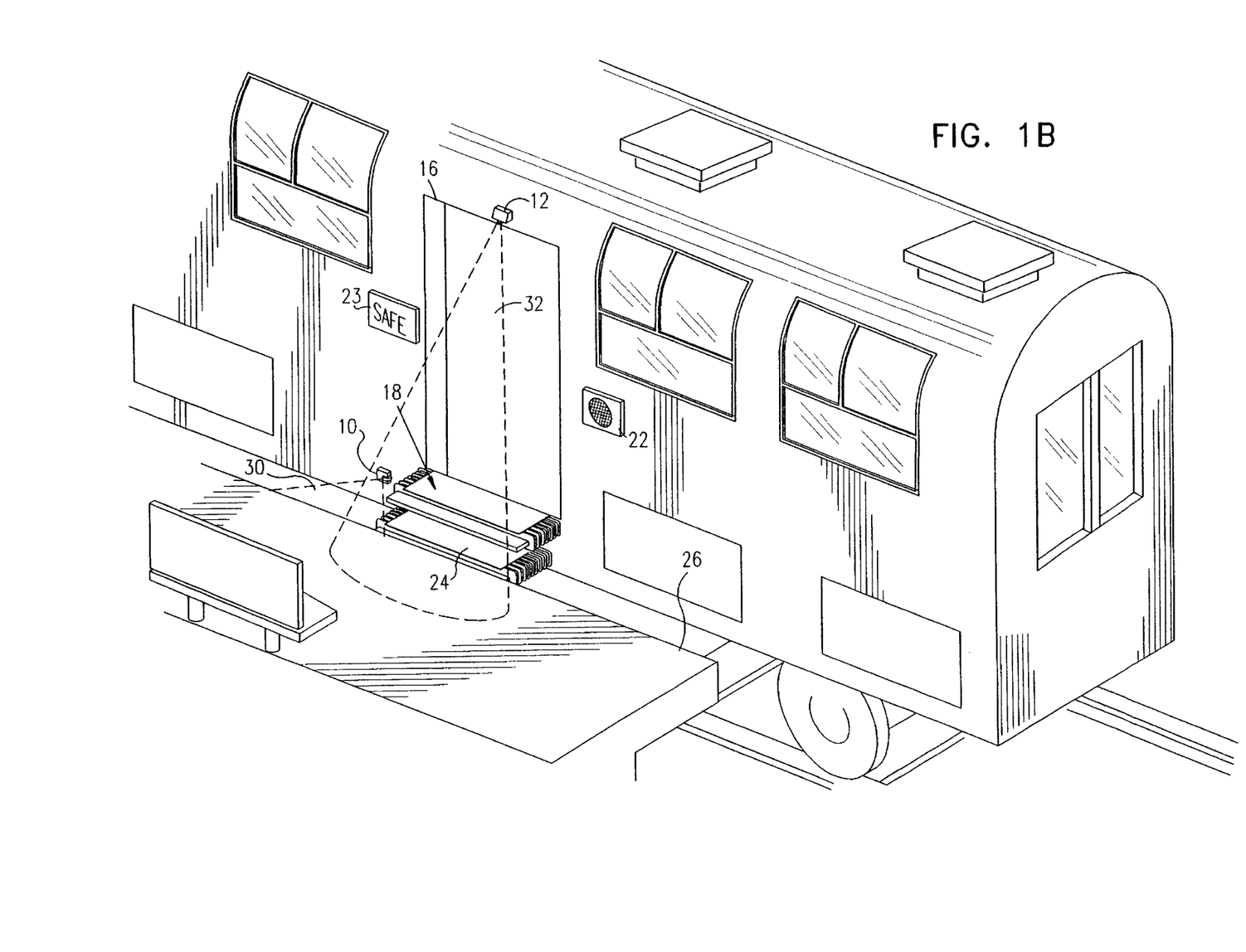
Figure 1C:
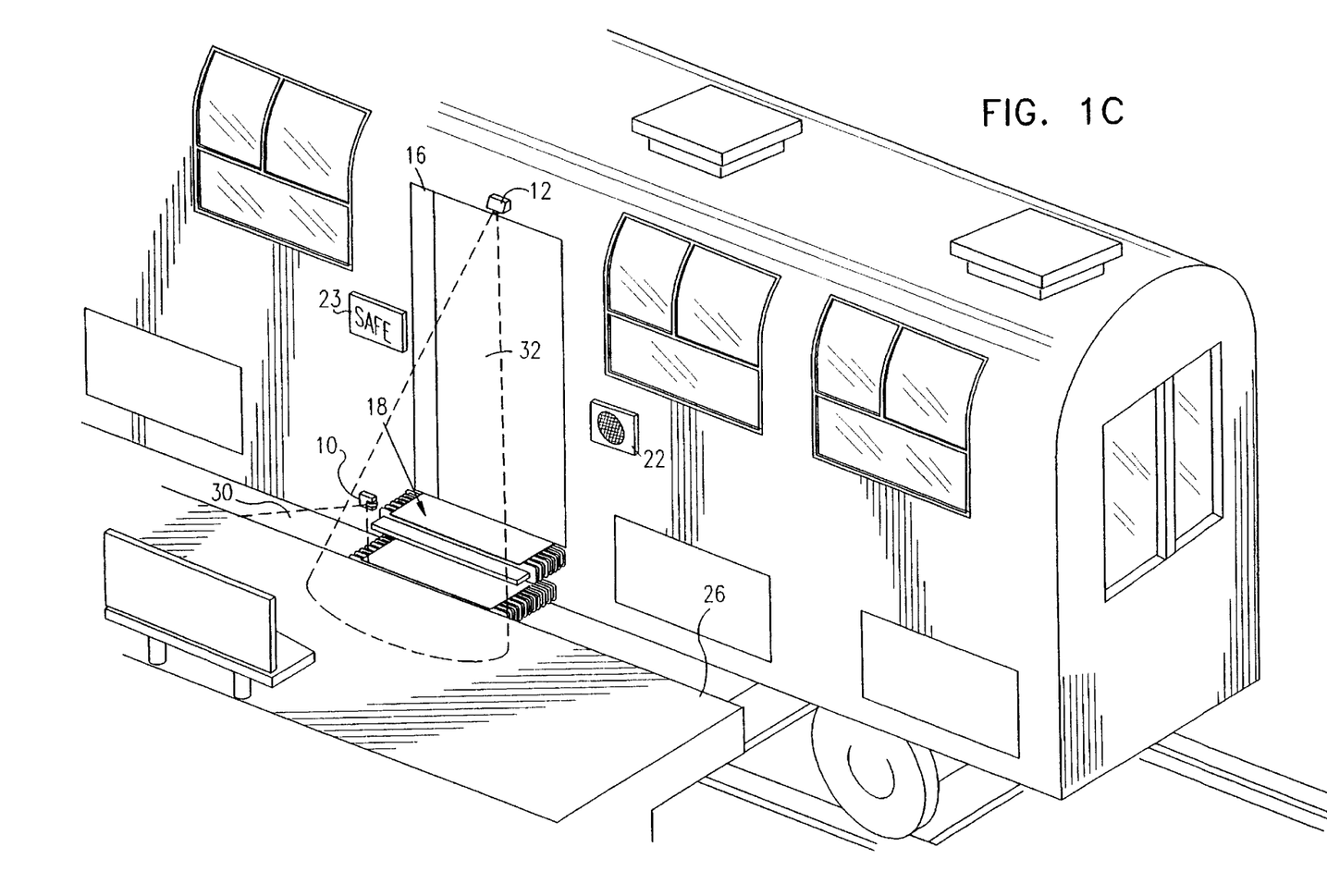

Selectably positionable step or platform assembly 18 may position a plurality of steps 24 in a variety of relationships with a platform 26. FIG. 1A illustrates selectably positionable step or platform assembly 18 positioning steps 24 above platform 26. In FIG. 1B, steps 24 are placed below the level of platform 26. In FIG. 1C, steps 24 are placed flush with platform 26.

Figure 2:
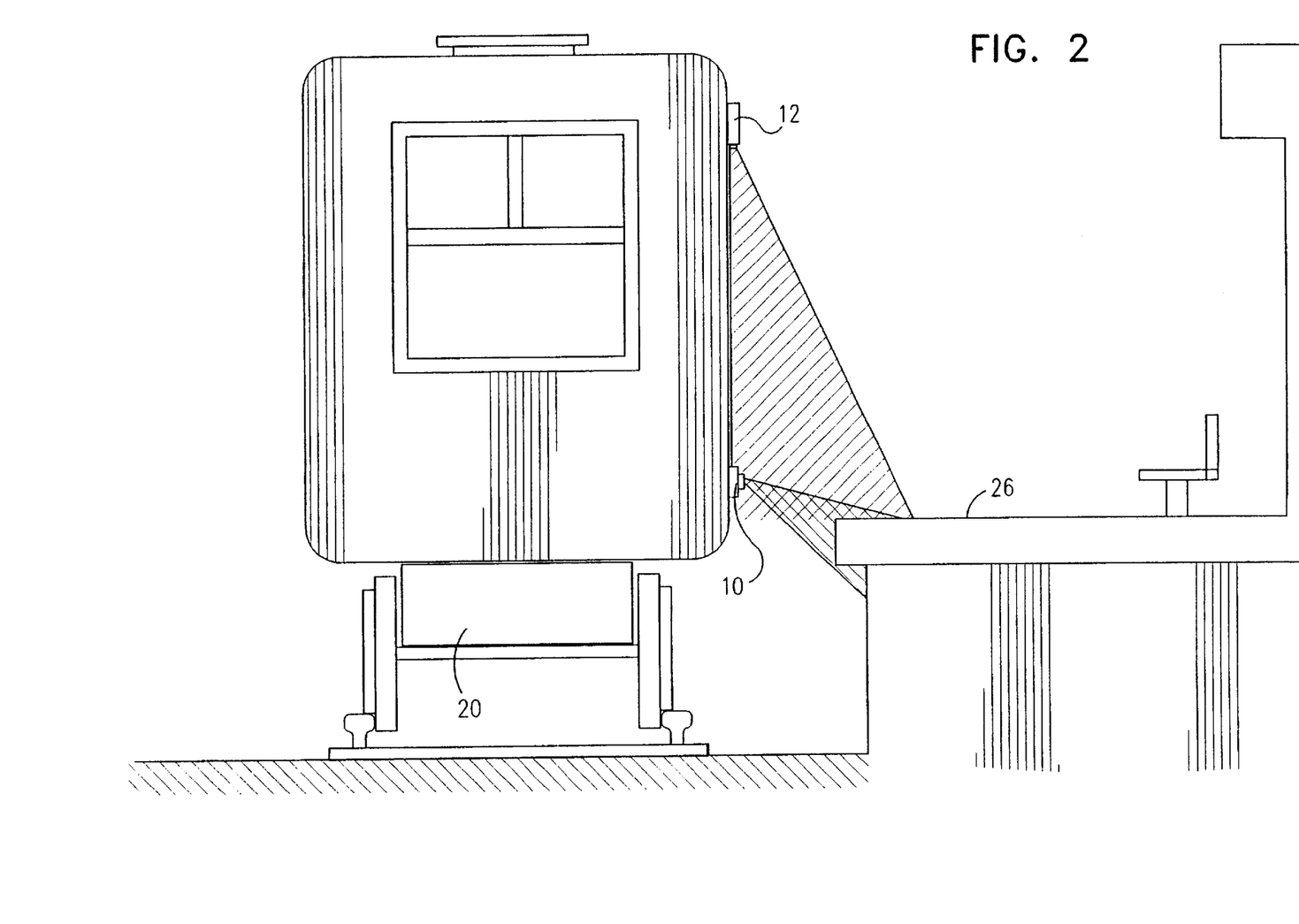
FIG. 2 is a side view illustration of the railway car equipped with a platform sensing and control system of FIGS. 1A, 1B and 1C, with the steps omitted for clarity.
Figure 3:
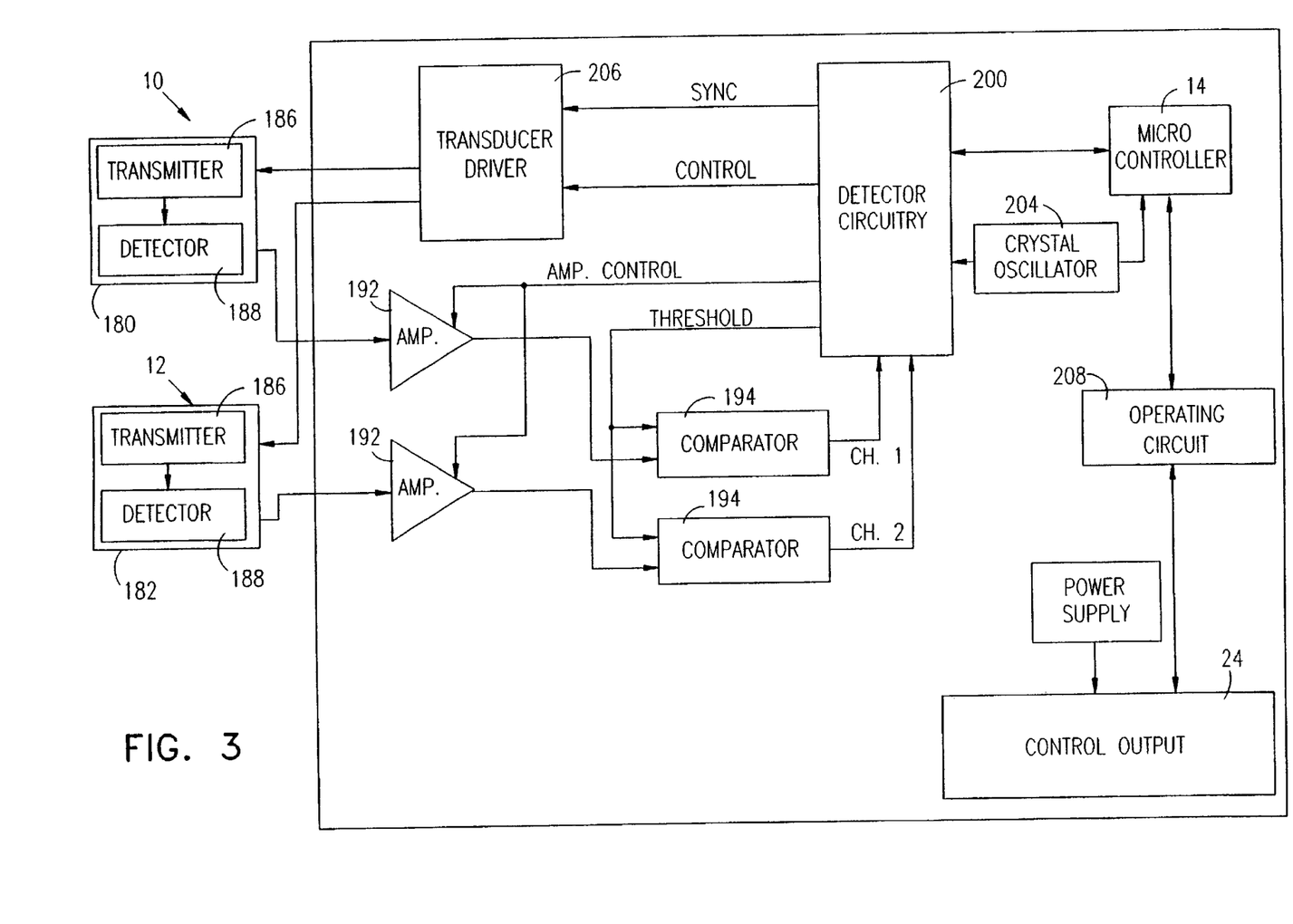
FIG. 3 is a simplified functional block diagram illustration of the system of FIGS. 1A–2.

Reference is now made to FIG. 3, which is a simplified block diagram illustration of preferred circuitry employed in the automatic door operating system of FIGS. 1A–2. Acoustic sensors 10 and 12 comprise two separate ultrasonic transducers 180 and 182, each of which includes an ultrasonic transmitter 186 which transmits ultrasonic energy, typically having a frequency in excess of 20 KHz, respectively into the volumes indicated by reference numerals 30 and 32 in FIGS. 1A–1C. Reflected ultrasonic energy is received at two separate detectors 188, each of which forms part of one of transducers 180 and 182. Detectors 188 may be any suitable detectors, such as a model 400ER 250 of Prowave Company of Taiwan, which typically is sensitive only to the frequency of the transmitter 186.

Preferably at least one of the transmitters 186 and detectors 188 and possibly both of them are operative within predetermined solid angles, thereby to limit false detections which could result from reflections of ultrasonic energy from outside the desired predetermined volume 30 or 32.

Figure 4:
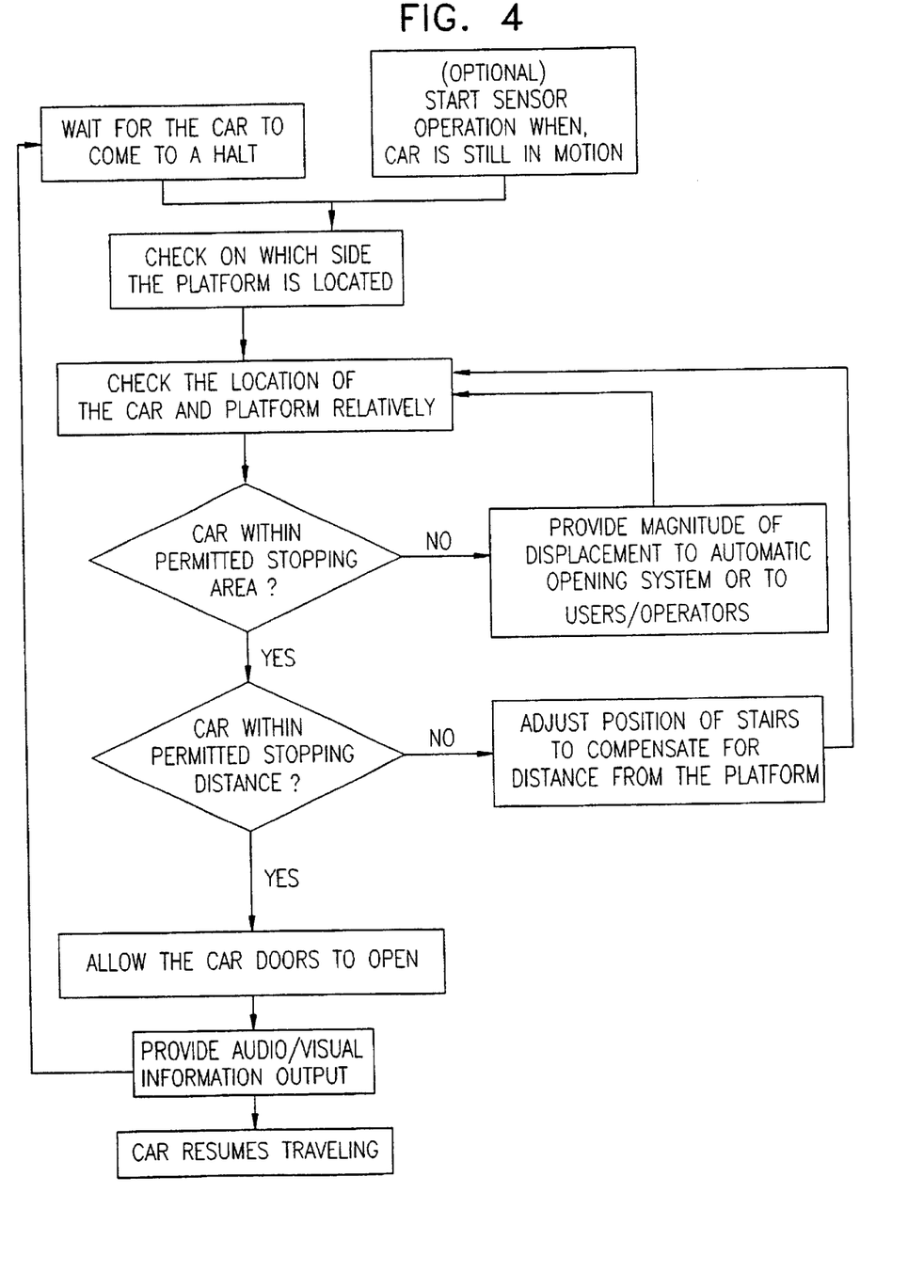
FIG. 4 is a simplified flowchart illustrating the operation of the invention.

In accordance with a preferred embodiment of the present invention, the arrangement of the transmitters 186 and the detectors 186 may enable the circuitry of FIG. 4 to determine the location of the platform by triangulation.

The outputs of detectors 186 are each supplied to analog amplifiers 192, which may be embodied in 3 CLC505 chips. The output of each analog amplifier 192 is supplied to a threshold comparator 194, such as an LM 119 chip, which compares the output of detector 186 with a predetermined threshold.

The outputs of comparators 194 are supplied to detector logic circuitry 200 which defines one or more time windows following transmission of the ultrasonic energy by transmitter 186, for receipt of reflected ultrasonic energy. These time windows correspond to distance from the transmitter and are operative to define the detection volume. The detector logic circuitry 200 is preferably embodied in an EPM 5160 chip commercially available from Altera of San Jose, Calif.

A microcontroller 14 receives an input from a crystal oscillator 204 which also provides an output to detection lotic circuitry 200, which is used for actuating a driver 206, which drives transmitters 186. Driver 206 is typically embodied in a MC 4452 chip, commercially available from Motorola.

Microcontroller 14 interfaces with an operating interface circuit 208. The operating interface circuit 208 may provide control outputs for automatic opening of doors when appropriate for enabling opening of appropriate doors by users/operators.

Additionally control inputs may be provided by microcontroller 14 for operating and suitably extending vertically and/or horizontally positionable stairs or platforms mounted on the railcar.

Reference is now made to FIG. 4, which is a simplified flowchart of the operation of the system of FIGS. 1A–2. Typically the system begins operation when the railcar comes to a full stop. Alternatively, the system may begin operation when the railcar is still in motion, approaching a platform. The outputs of sensors 10 and 12 may be used to indicate whether a platform is present at one, both or neither side of the railcar. Alternatively, a train personnel, such as a conductor or engineer, may manually input an indication of whether the platform is present at one, both or neither side of the railcar. Sensors 10 and 12 indicate the relative position of the doors of the railcar with respect to the platform. Doors are opened or enabled to be opened by users only when such doors face a platform meeting predetermined criteria of transverse distance and relative height.

The outputs of sensors 10 and 12, which are typically provided for each door of the railcar are processed by the microcontroller 14 to provide control outputs for automatic opening of doors when appropriate for enabling opening of appropriate doors by users/operators.

Additionally control inputs may be provided by microcontroller 14 for operating and suitably extending vertically and/or horizontally positionable stairs or platforms mounted on the railcar.

Information outputs are preferably provided to audio/visual traveler interfaces to indicate which doors may be used for ingress and egress.

It will be appreciated by persons skilled in the art that the present invention is not limited by what has been particularly shown and described hereinabove. Rather the scope of the present invention includes combinations and subcombinations of the various elements described hereinabove as well as variations and further developments which would occur to a person of ordinary skill in the art as a matter of course upon reading the foregoing description and which are not in the prior art.

What is claimed is:

1. A platform sensing and control system comprising:

an active wireless sensor for sensing at least the passive presence of a platform opposite a door of a railcar; and providing an output indication of at least platform presence in response thereto; and a door control controller operative in response to said output indication of at least platform presence for ensuring that normally the door is not opened other than when a platform is located opposite said door.

2. A platform sensing and control system comprising:

a wireless sensor for sensing at least the presence of a platform opposite a door of a railcar and providing an output indication of at least platform presence in response thereto; and a door control controller operative in response to said output indication of at least platform presence for ensuring that normally the door is not opened other than when a platform is located opposite said door, and wherein said wireless sensor is operative to provide an output indication of at least platform height and transverse distance from the railcar door to the platform.

3. A platform sensing and control system according to claim 2 and also comprising a selectably positionable step or platform assembly associated with the railcar door.

4. A platform sensing and control system according to claim 2 and also comprising:

an audio annunciator to provide information to travelers regarding at least one of the following:

which doors are being opened;

transverse distance between the railcar and the platform; and
relative height between the railcar and the platform.

5. A platform sensing and control system according to claim 3 and also comprising:
an audio annunciator to provide information to travelers regarding at least one of the following:
which doors are being opened;
transverse distance between the railcar and the platform; and
relative height between the railcar and the platform.

6. A platform sensing and control system according to claim 2 and also comprising:
an visual indicator to provide information to travelers regarding at least one of the following:
which doors are being opened;
transverse distance between the railcar and the platform and
relative height between the railcar and the platform.

7. A platform sensing and control system according to claim 3 and also comprising:
an visual indicator to provide information to travelers regarding at least one of the following:
which doors are being opened;
transverse distance between the railcar and the platform; and
relative height between the railcar and the platform.

8. A platform sensing and control system according to claim 4 and also comprising:
an visual indicator to provide information to travelers regarding at least one of the following:
which doors are being opened;
transverse distance between the railcar and the platform; and
relative height between the railcar and the platform.

9. A platform sensing and control system according to claim 5 and also comprising:
an visual indicator to provide information to travelers regarding at least one of the following:
which doors are being opened;
transverse distance between the railcar and the platform; and
relative height between the railcar and the platform.

10. A method for platform sensing and control comprising:
indicating whether a platform is present at least one side of a railcar;
utilizing an active wireless sensor for sensing at least the passive presence of a platform opposite a door of a railcar and providing an output indication of at least platform presence in response thereto; and
ensuring, in response to said output indication of at least platform presence, that normally the door is not opened other than when a platform is located opposite said door.

11. A method according to claim 10 wherein said indicating is performed automatically by a sensor.

12. A method according to claim 10 wherein said indicating is performed manually.

13. A method according to claim 10, wherein performance of said method begins when said railcar comes to a full stop.

14. A method according to claim 11, wherein performance of said method begins when said railcar comes to a full stop.

15. A method according to claim 12, wherein performance of said method begins when said railcar comes to a fill stop.

16. A method according to claim 10, wherein performance of said method begins when said railcar is still in motion, approaching said platform.

17. A method according to claim 11, wherein performance of said method begins when said railcar is still in motion, approaching said platform.

18. A method according to claim 12, wherein performance of said method begins when said railcar is still in motion, approaching said platform.

19. A method for platform sensing and control system comprising:
indicating whether a platform is present at least one side of a railcar;
sensing at least the presence of a platform opposite a door of a railcar and providing an output indication of at least platform presence in response thereto; and
ensuring, in response to said output indication of at least platform presence, that normally a door is not opened other than when a platform is located opposite said door,
and comprising providing an output indication of at least platform height and transverse distance from a railcar door to the platform.

20. A method for platform sensing and control system comprising:
indicating whether a platform is present at least one side of a railcar;
sensing at least the presence of a platform opposite a door of a railcar and providing an output indication of at least platform presence in response thereto; and
ensuring, in response to said output indication of at least platform presence, that normally a door is not opened other than when a platform is located opposite said door,
wherein said indicating is performed automatically by a sensor,
and comprising providing an output indication of at least platform height and transverse distance from a railcar door to the platform.

21. A method for platform sensing and control system comprising:
indicating whether a platform is present at least one side of a railcar;
sensing at least the presence of a platform opposite a door of a railcar and providing an output indication of at least platform presence in response thereto; and
ensuring, in response to said output indication of at least platform presence, that normally a door is not opened other than when a platform is located opposite said door,
wherein said indicating is performed manually,
and comprising providing an output indication of at least platform height and transverse distance from a railcar door to the platform.

22. A method for platform sensing and control system comprising:
indicating whether a platform is present at least one side of a railcar;
sensing at least the presence of a platform opposite a door of a railcar and providing an output indication of at least platform presence in response thereto; and
ensuring, in response to said output indication of at least platform presence, that normally a door is not opened other than when a platform is located opposite said door,
wherein performance of said method begins when said railcar comes to a full stop,
and comprising providing an output indication of at least platform height and transverse distance from a railcar door to the platform.

23. A method for platform sensing, and control system comprising:
  indicating whether a platform is present at least one side of a railcar;
  sensing at least the presence of a platform opposite a door of a railcar and providing an output indication of at least platform presence in response thereto; and
  ensuring, in response to said output indication of at least platform presence, that normally a door is not opened other than when a platform is located opposite said door,
    wherein said indicating is performed automatically by a sensor and performance of said method begins when said railcar comes to a full stop,
    and comprising providing an output indication of at least platform height and transverse distance from a railcar door to the platform.

24. A method for platform sensing and control system comprising:
  indicating whether a platform is present at least one side of a railcar;
  sensing at least the presence of a platform opposite a door of a railcar and providing an output indication of at least platform presence in response thereto; and
  ensuring, in response to said output indication of at least platform presence, that normally a door is not opened other than when a platform is located opposite said door,
    wherein said indicating is performed manually and performance of said method begins when said railcar comes to a full stop,
    and comprising providing an output indication of at least platform height and transverse distance from a railcar door to the platform.

25. A method for platform sensing and control system comprising:
  indicating whether a platform is present at least one side of a railcar;
  sensing at least the presence of a platform opposite a door of a railcar and providing an output indication of at least platform presence in response thereto; and
  ensuring, in response to said output indication of at least platform presence, that normally a door is not opened other than when a platform is located opposite said door,
    wherein performance of said method begins when said railcar is still in motion, approaching said platform,
    and comprising providing an output indication of at least platform height and transverse distance from a railcar door to the platform.

26. A method for platform sensing and control system comprising:
  indicating whether a platform is present at least one side of a railcar;
  sensing at least the presence of a platform opposite a door of a railcar and providing an output indication of at least platform presence in response thereto; and
  ensuring, in response to said output indication of at least platform presence, that normally a door is not opened other than when a platform is located opposite a door, wherein said indicating is performed automatically by a sensor and performance of said method begins when said railcar is still in motion, approaching said platform,
    and comprising providing an output indication of at least platform height and transverse distance from a railcar door to the platform.

27. A method for platform sensing and control system comprising:
  indicating whether a platform is present at least one side of a railcar;
  sensing at least the presence of a platform opposite a door of a railcar and providing an output indication of at least platform presence in response thereto; and
  ensuring, in response to said output indication of at least platform presence, that normally a door is not opened other than when a platform is located opposite said door,
    wherein said indicating is performed manually and performance of said method begins when said railcar is still in motion, approaching said platform,
    and comprising providing an output indication of at least platform height and transverse distance from a railcar door to the platform.

28. A platform sensing and control system according to claim 1 and wherein said wireless sensor is operative to provide an output indication of at least platform height and transverse distance from the railcar door to the platform.

29. A platform sensing and control system according to claim 28 and also comprising a selectably positionable step or platform assembly associated with the railcar door.

30. A platform sensing and control system according to claim 28 and also comprising:
  an audio annunciator to provide information to travelers regarding at least one of the following:
    which doors are being opened;
    transverse distance between the railcar and the platform; and
    relative height between the railcar and the platform.

31. A platform sensing and control system according to claim 29 and also comprising:
  an audio annunciator to provide information to travelers regarding at least one of the following:
    which doors arc being opened;
    transverse distance between the railcar and the platform; and
    relative height between the railcar and the platform.

32. A platform sensing and control system according to claim 28 and also comprising:
  an visual indicator to provide information to travelers regarding at least one of the following:
    which doors are being opened;
    transverse distance between the railcar and the platform; and
    relative height between the railcar and the platform.

33. A platform sensing and control system according to claim 29 and also comprising:
  an visual indicator to provide information to travelers regarding at least one of the following:
    which doors are being opened;
    transverse distance between the railcar and the platform; and
    relative height between the railcar and the platform.

34. A platform sensing and control system according to claim 30 and also comprising:
  an visual indicator to provide information to travelers regarding at least one of the following:
    which doors are being opened;
    transverse distance between the railcar and the platform; and
    relative height between the railcar and the platform.

35. A platform sensing and control system according to claim 31 and also comprising:

an visual indicator to provide information to travelers regarding at least one of the following:
which doors are being opened;
transverse distance between the railcar and the platform; and
relative height between the railcar and the platform.

36. A method according to claim 10 and comprising providing an output indication of at least platform height and transverse distance from a railcar door to the platform.

37. A method according to claim 11 and comprising providing an output indication of at least platform height and transverse distance from a railcar door to the platform.

38. A method according to claim 12 and comprising providing an output indication of at least platform height and transverse distance from a railcar door to the platform.

39. A method according to claim 13 and comprising providing an output indication of at least platform height and transverse distance from a railcar door to the platform.

40. A method according to claim 14 and comprising providing an output indication of at least platform height and transverse distance from a railcar door to the platform.

41. A method according to claim 15 and comprising providing an output indication of at least platform height and transverse distance from a railcar door to the platform.

42. A method according to claim 16 and comprising providing an output indication of at least platform height and transverse distance from a railcar door to the platform.

43. A method according to claim 17 and comprising providing an output indication of at least platform height and transverse distance from a railcar door to the platform.

44. A method according to claim 18 and comprising providing an output indication of at least platform height and transverse distance from a railcar door to the platform.

* * * * *

UNITED STATES PATENT AND TRADEMARK OFFICE
CERTIFICATE OF CORRECTION

PATENT NO. : 6,341,563 B1
DATED : January 29, 2002
INVENTOR(S) : Gal Agam Ben-Bassat Jashek It is certified that error appears in the above-identified patent and that said Letters Patent is hereby corrected as shown below:

<u>Title page,</u>
Item [87], PCT Pub. No. delete "WO98/00268" and substitute -- WO 98/58148 --.

Signed and Sealed this

Fifteenth Day of October, 2002

Attest:

Attesting Officer

JAMES E. ROGAN
*Director of the United States Patent and Trademark Office*